Patented May 3, 1938

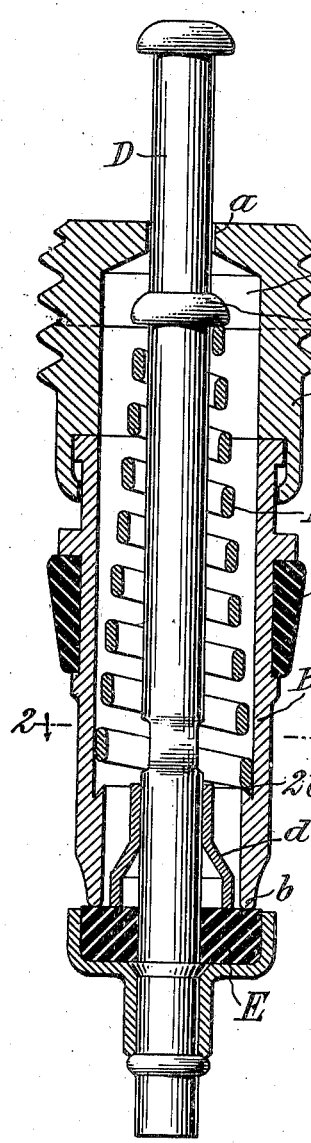
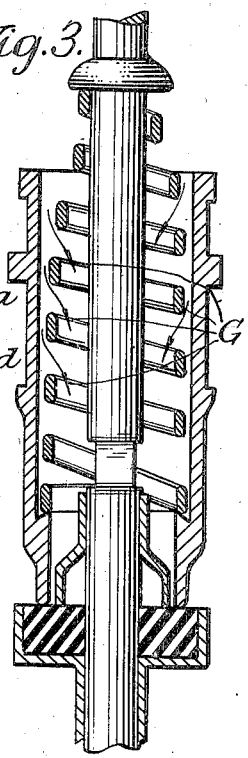
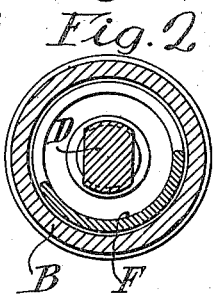
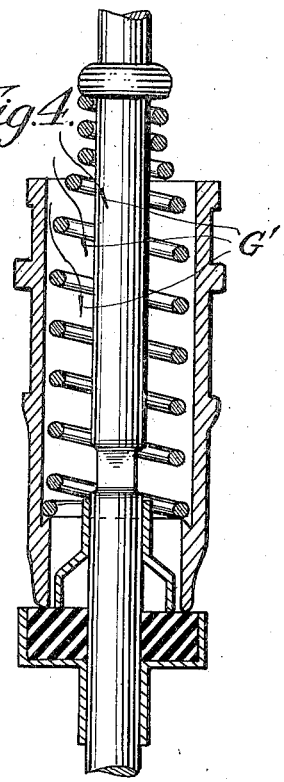

2,116,087

UNITED STATES PATENT OFFICE 2,116,087

VALVE CORE

John Wahl, Rosedale, N. J., assignor, by mesne assignments, to Scovill Manufacturing Company, Brooklyn, N. Y., a corporation of Connecticut Application October 31, 1934, Serial No. 750,804

5 Claims. (Cl. 152—12)

My present invention relates to valves for pneumatic tires and the like and aims to provide certain improvements therein.

Pneumatic tire valves and the like usually consist of a spring-pressed check valve mounted within a casing, the maximum diameter of which is limited and has been standardized by the S. A. E. The internal threads on these valve casings have also been standardized and thus limit the maximum diameter of the valve core or insides which are held in place within the casing by said screw-threads. Because of these limitations, various means have been proposed for increasing the inflation and deflation rate through the valve casing. Among these are, providing a chamber of larger diameter than the screw-threads in the casing below the valve check, increasing to its practicable maximum the diameter of the bore through the valve core, reducing the diameter of the valve pin to a minimum consistent with strength and rigidity and modifying the form of the valve spring.

While the various means heretofore devised for increasing the inflation rate through the valve casing have contributed to the high efficiency of the present-day types of valve cores, I have found that I can still further and substantially increase the inflation rate through a valve casing of standard dimensions. This I accomplish by the use of a novel form of spring, which, in its cooperative arrangement within a valve core, leaves a greater effective cross-sectional area of the valve core bore for the passage of air and substantially reduces the air friction through said core.

According to my present invention I provide a stream-lined spring, or, in other words, a valve check closing spring formed of flattened, round wire, with the major axis of the convolutions parallel to the line of air flow, whereby far less resistance is offered to the air passing through the valve core than by the conventional springs of round cross-section. My invention also embodies other features of novelty which will be better understood from the detailed description which follows and the accompanying drawing, wherein I have shown the invention as applied to a short type valve core, and wherein:

Figure 1 is a diametrical section through a valve core embodying my invention.

Fig. 2 is a transverse section taken along the plane of the line 2—2 of Fig. 1.

Figs. 3 and 4 are enlarged fractional diametrical sectional views showing by comparison the air flow through a valve core of the present invention and one of standard construction, respectively.

In the present-day standard or usual short valve core or insides, that is, a valve core wherein the valve spring is disposed above the valve check member, a spring formed of wire of circular cross-section is employed, and in order to secure a high opening pressure, a relatively large diameter wire is required. Such wire has three limitations as regard to air flow, namely, (1) being round, it offers considerable resistance to the flow of air, with cavitation and turbulence as major factors inherent to the shape; (2) the coils come more closely together when the valve check is open, thus further restricting the air flow; and (3) the ledge required to support a round spring necessitates a restriction to the main air passage.

By using a flattened, round wire wound into a spring having the major axis of the wire parallel to the line of air flow, the limitations inherent to a spring formed of round wire are overcome. Furthermore, the flattened, round section presents a more perfect aerodynamic form than does a circular section. A flattened, round wire spring also more efficiently allocates the spring material to secure maximum opening pressure, and the thinness of the individual coils reduces to a minimum the obstruction to the longitudinal air flow. The use of a flattened, round wire spring has the further advantage that a narrow ledge may be used to support the spring, and by making said ledge re-entrant it will serve to positively support the spring.

Referring now to Figs. 1 and 2 of the drawing wherein I have shown a preferred embodiment of my invention as applied to a short type of valve core, let A indicate the plug member which is swively connected to a valve seat member B having a packing C adapted to form an airtight joint with a seat within a tire valve casing (not shown), the plug and seat members being mounted upon a valve pin D, which, at its lower end carries a valve check E adapted to be held against the seating edge $b$ of the valve seat member by a spring F. For properly centering and guiding the valve check in its movements there is mounted on the valve pin over the valve check proper a guiding ferrule $d$, and the upper portion of the pin extends through a guiding opening $a$ in the top of the plug A. For introducing the valve core into the valve casing the top of the plug is formed as a screw-driver projection by having opposite cylindrical portions of its wall cut away whereby lateral openings $2a$ are provided for the ingress and egress of air through the plug. The valve seat member B rearwardly or inwardly from the valve seating edge b has its bore enlarged to provide a ledge or shoulder 2b for supporting one end of the spring, the opposite end of which bears against an abutment or enlargement 2d on the valve pin. The valve core construction thus far described is conventional and merely provides a setting for the present invention.

According to the present invention the valve check closing spring F is formed of flattened, round wire with the major axis of the wire extending substantially parallel to the axis of the spring. Furthermore, the convolutions of the spring are preferably arranged in echelon with the convolution of largest diameter seating against the ledge 2b. In view of the fact that the minor axis or dimension of the flattened, round wire from which the spring is formed extends in a direction substantially at right-angles to the axis of the spring and line of flow of the air through the valve core, it will be appreciated that the ledge 2b can be made narrower than would be necessary to support a spring of round cross-section and of somewhat larger diameter than the minor axis of the spring of the present construction. Furthermore, by forming the ledge 2b as a re-entrant projection an annular channel or groove is provided thereat which serves to positively hold the largest convolution of the spring in place.

I have found that I can obtain with a 7-coil spring of flattened round wire having a minor axis of .008 of an inch and a major axis of .021 of an inch, the same compressive resistance as with a 10-coil spring of round wire having a diameter of .012 of an inch, where the material of the springs and the temper thereof are approximately the same. In addition the flattened round wire spring offers a freer passage for the air therethrough and through the valve insides of which it constitutes a part. It will thus be seen from a comparison of Figs. 3 and 4 that if the ledge for supporting the spring of flattened, round cross-section is of a width substantially equal to the minor axis of the spring, that such ledge, if required to support a spring of round cross-section, would result in said spring overhanging said ledge. In other words, the spring of round cross-section would restrict the effective cross-sectional area of the valve seat member through which the air must pass. By actual computation I find that using spring sections with the dimensions above stated and a bore diameter below the ledge 2b of .102 inch, the flattened, round spring provides 19% greater effective area through which air may flow below the ledge. To secure this advantage I prefer that the outer diameter of the terminal convolution of my flattened, round spring at the ledge should be large enough to contact with the bore of the valve seat member above the ledge.

The disposition and shape of my valve spring I find presents a substantially perfect aerodynamic form, that is to say, it offers least resistance to the flow of air through the core casing. This will be appreciated from an inspection of Figs. 3 and 4 wherein I have shown by arrows G and G' the probable direction of flow of the air particles through the convolutions of the springs. In Fig. 3 it will be noted that arrows G approach parallelism with the axis of the bore or normal line of air flow, whereas in Fig. 4 the arrows G' form a decided angle which approaches a right-angle with the line of air flow. It will also be appreciated that where the air flow takes place, as indicated in Fig. 4, there will be set up within the bore a turbulence of the air which will further retard the air flow. Actual test has proven that with my present construction substantially more rapid inflation and deflation of tires is obtainable than with valve springs as shown in Fig. 4.

The invention, it will be appreciated, is also applicable to the long type of valve core where the valve check spring is disposed in a chamber beneath the valve check, and also to other constructions of air valves. Accordingly, while I have shown and described but a single embodiment of my invention, I do not wish to be limited to the precise construction disclosed since modifications thereof may be resorted to without departing from the spirit of the invention.

What I claim is:

1. A tire valve or the like, comprising a helical spring of flattened, round wire, the major axis of which is substantially parallel to the line of air flow through the valve.

2. A tire valve or the like, comprising a helical spring of flattened, round wire, the major axis of which is substantially parallel to the line of air flow through the valve, the convolutions of the spring being of progressively increasing diameter from one end of the spring to the other.

3. A tire valve or the like, comprising a casing having a bore therethrough of different diameters, a re-entrant ledge between two bore portions of different diameters adapted to positively support a spring, and a spring of a thickness substantially equal to the width of the ledge supported thereon but not overhanging said ledge.

4. A tire valve or the like, comprising a casing having a bore therethrough of different diameters, a re-entrant ledge between two bore portions of different diameters adapted to positively support a spring, and a spring of flattened, round wire, having its minor axis of a thickness substantially equal to the effective width of the ledge supported thereon but not overhanging said ledge.

5. A tire valve core or valve insides, comprising a casing having an air passage therethrough and terminating at one end in a valve seat, an annular ledge in the bore of said casing rearwardly from said valve seat against which ledge a valve closing spring can seat, a valve pin extending through said bore and having a valve check for engaging the valve seat, and a helical valve spring within said bore having at one end a convolution bearing against said ledge and at its opposite end a convolution bearing against means on the valve pin, said valve spring being of flattened, round wire, the major axis of which is substantially parallel to the axis of the casing bore and the convolutions of said spring being of increasing diameter from its end in engagement with the means on the valve pin to its end which bears on the ledge.

JOHN WAHL.